United States Patent [19]

Schaller et al.

[11] 4,438,467
[45] Mar. 20, 1984

[54] MAGNETIC DISK TRACK FOLLOWING SERVO BURST AMPLITUDE DROP COMPENSATION

[75] Inventors: Karl H. Schaller, Herrenberg; Volker Zimmermann, Sindelfingen, both of Fed. Rep. of Germany

[73] Assignee: International Business Machines Corporation, Armonk, N.Y.

[21] Appl. No.: 362,939

[22] Filed: Mar. 29, 1982

[30] Foreign Application Priority Data

May 22, 1981 [DE] Fed. Rep. of Germany ....... 3120327

[51] Int. Cl.³ .......................... G11B 5/58; G11B 21/10
[52] U.S. Cl. ..................................... 360/77; 360/38.1; 318/563
[58] Field of Search ................. 360/38.1, 77; 318/563, 318/611, 632

[56] References Cited

U.S. PATENT DOCUMENTS

| | | | |
|---|---|---|---|
| 3,185,972 | 5/1965 | Sippel | 340/174.1 |
| 3,309,460 | 3/1967 | Rank | 360/38.1 |
| 3,463,982 | 8/1969 | Eldridge | 318/563 |
| 3,691,543 | 9/1972 | Mueller | 340/174.1 B |
| 3,911,208 | 10/1975 | Tehma | 360/38.1 |
| 3,947,873 | 3/1976 | Buchan | 360/38.1 |
| 4,285,015 | 8/1981 | Rose et al. | 360/77 |
| 4,412,165 | 10/1983 | Case et al. | 360/77 |

FOREIGN PATENT DOCUMENTS

| | | | |
|---|---|---|---|
| 54-25143 | 2/1979 | Japan | 318/632 |
| 57-43202 | 3/1982 | Japan | 318/632 |
| 646469 | 5/1979 | U.S.S.R. | 360/38.1 |

OTHER PUBLICATIONS

IBM-TDB vol. 20, No. 1, Jun. 1977, pp. 38–41, Servo Error Detection Using Pointers, Gardner et al.

Malone, "Dynamic Write Precompensation", IBM TDB, vol. 22, No. 5, 10-79, p. 2091.

Brock et al., "Recording Position Signals on Record Disks", IBM TDB, vol. 22, No. 8A, 1-1980, pp. 3127–3130.

Palmer et al., "Packwriter Write Correction System", IBM TDB, vol. 13, No. 11, 4-71, p. 3505.

Primary Examiner—George G. Stellar
Attorney, Agent, or Firm—Walter J. Madden, Jr.

[57] ABSTRACT

To compensate for drops in the amplitude of signals read from magnetic records, in particular servo signals, a complementary correction signal is produced from the signal drops by rectifying, low-pass filtering, differentiating, integrating and forming the absolute value. This complementary correction signal is added to the defective signal to obtain a signal which has roughly been corrected to the original magnitude prior to evaluating and forming the position error signal (PES).

5 Claims, 2 Drawing Figures

MAGNETIC DISK TRACK FOLLOWING SERVO BURST AMPLITUDE DROP COMPENSATION

BACKGROUND OF THE INVENTION

1. Field of the Invention

The invention concerns a method of compensating for decreases or drops in the amplitude of signals read from magnetic record carriers, in particular to drops in servo signals for track following control of magnetic heads, as well as an arrangement for implementing this method.

2. Description of Prior Art

In so-called sector servo systems for track following on magnetic disk files, sectors or bursts of servo information are interspersed around the disk between recorded portions containing data. There are a number of different servo patterns employed in such files, but they all involve detecting the bursts of servo information and using this information to generate a position error signal (PES) which is employed to maintain the magnetic head properly centered over the desired data track.

Whenever there are defects in a magnetic layer, drops in the amplitude of signals read from the magnetic record carriers occur at the very point at which the signal to be read is recorded. This is true whether the defects in the magnetic layer existed from the time of manufacture, or whether they are attributable to scratches that occurred during operation, such as by contact of the layer with the magnetic head. It is obvious that errors in the read signal lead to read errors with serious consequences.

If the read signals are servo signals which are used for the track following control of magnetic heads, then erroneous read signals may lead to faulty position signals and thus to a faulty track following of the magnetic head. U.S. Pat. No. 3,185,972, for example, shows a track following control of a magnetic head by means of servo signals in which the servo signals are sampled at servo marks recorded in servo sectors of the recording tracks. The servo sectors are positioned at identical angular spacings between the data sectors of the magnetic disk. Sampling of the data and servo sectors is effected with the aid of a magnetic head which is adjusted to the track address of a recording track by means of the access unit. For adjusting the track address and for its observance, i.e., the head follows the track to which it has been originally adjusted, the servo system is controlled by switching means synchronized with the disk rotation. As a result, the servo signals read by the magnetic head when the servo sectors are sampled are fed at predetermined intervals to the servo control where they are evaluated and used for control purposes.

U.S. Pat. No. 3,691,543 shows the derivation of the magnetization pattern of a servo track from two adjacent track areas with positive magnetization or flux changes at points arranged in parallel. Between these positive flux changes each track area has a negative flux change which is staggered relative to the negative flux changes of the adjacent tracks. The servo signals for track centering the magnetic head are derived from the negative flux changes that are spaced from each other. The clock signals are derived from the positive flux changes of the servo tracks.

An article in the IBM Technical Disclosure Bulletin, Vol. 13, No. 11, April 1971, page 3505, shows compensating for errors occurring in the servo signals by increasing the length of the defective servo signal marks, thus compensating for their impaired energy content and restoring them to their previous state. In practice this necessitates that after recording on a magnetic record carrier has been completed, the servo marks are accurately read and checked so that they may be appropriately modified and rewritten if defects are detected. This involves great expense on the one hand and makes it impossible on the other to eliminate those defects that are connected only during the operation of the magnetic record carrier, for example, by its surface becoming scratched.

An article of the IBM Technical Disclosure Bulletin, Vol. 22, No. 8A, January 1980, pp 3127–3130, describes a method in conjunction with the accurate recording of servo signals, whereby surface defects occurring after fabrication are detected as the servo signals are recorded and are eliminated by appropriately modifying the servo signal recordings. In accordance with this method, the servo recording of a track is based on a comparison of the servo recordings of the few previously recorded servo signals of adjacent tracks. This applies to the track spacings as well as the signal strength. This method is suitable for eliminating only those servo signal errors that have occurred during recording of the servo signals. Errors subsequently encountered cannot be compensated for.

For compensating for defective areas and for preventing signals being written on to defective areas of magnetic record carriers, the IBM Technical Disclosure Bulletin, Vol. 22, No. 5, October 1979, page 2091, shows including in the data recordings information as to which areas of the record carrier cannot be recorded on. This approach also necessitates that defective areas, before being used as data carriers, are detected and recorded. Defective areas which result only during operation may still lead to errors.

SUMMARY OF THE INVENTION

The above problems are remedied by the present invention. The invention accomplishes the object of compensating for or rendering largely ineffective drops in the amplitude of read signals of servo signals so that erroneous information on the signals does not occur or that the signals differ only negligibly from their correct recording.

The chief advantages obtained by means of the invention are that signal amplitude drops caused by errors occurring during operation, for example, scratches caused by head contact, do not lead to erroneous signals because they are either fully compensated for or largely reduced. This can be realized at low technical outlay by means of the method and the arrangement in accordance with the invention.

BRIEF DESCRIPTION OF THE DRAWINGS

One possible way of carrying out the invention will be described in detail below with reference to the drawing in which.

DESCRIPTION OF THE PREFERRED EMBODIMENT

Figure 1:
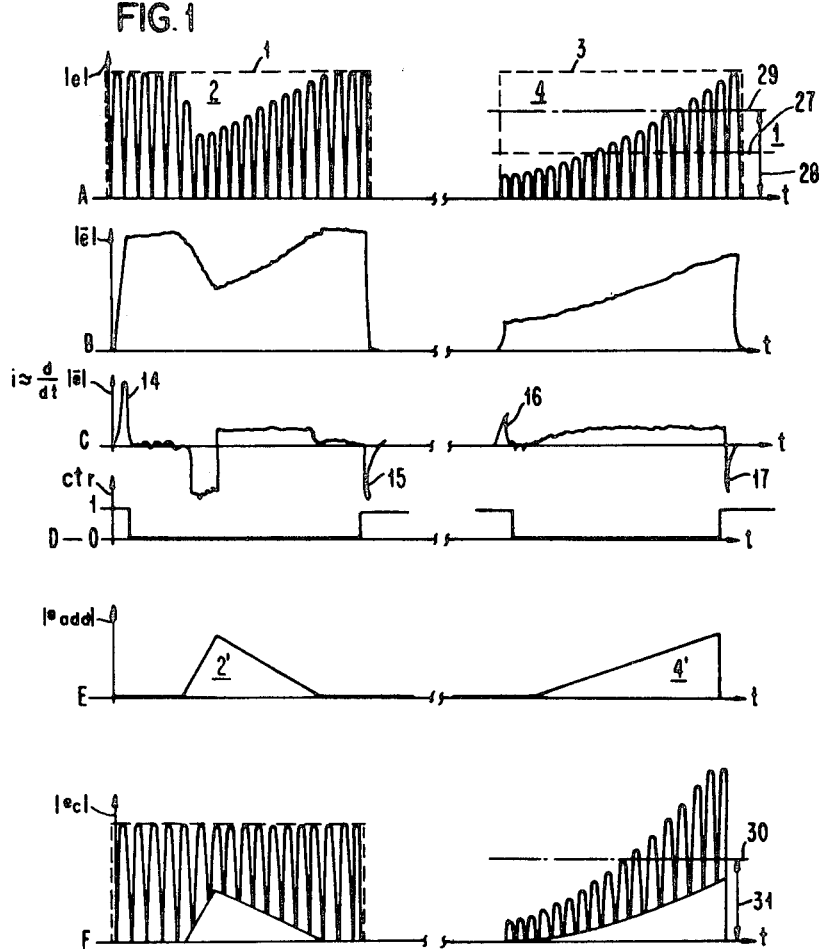
FIG. 1 shows different signal curves as a function of time for two typical examples of signal amplitude drops compensated for or reduced by the method of the invention.
Figure 2:
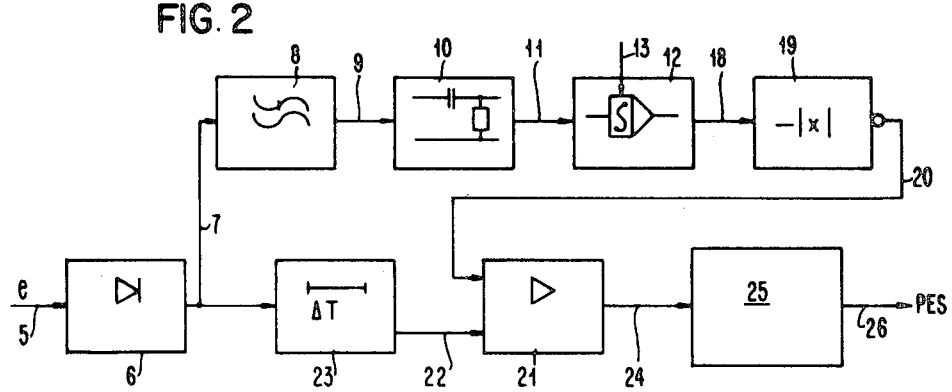
FIG. 2 is a schematic block diagram of circuitry for implementing the method of the invention.

The left half of line A in FIG. 1 shows a servo signal, referred to as a burst signal, in whose envelope 1, there is a triangular drop 2. The right half of line A of FIG. 1 shows a further example of a burst signal with an envelope 3 whose signal drop 4 is such that the signal falls short of the full value of the envelope 3 right from the beginning. In comparison with this, the signal in the first case in the left half of line A of FIG. 1 is diminished only to such an extent that the full value of the envelope is present at the beginning and end, and that in the time in between, the signal is diminished by the triangular drop 2. The signal $|e|$ shown in FIG. 1, line A, is obtained by full-wave rectification or by generating the magnitude of the signal e which as a servo signal is detected by the magnetic head and fed to a circuit shown in the block diagram of FIG. 2. According to FIG. 2, this signal e is fed on an input line 5 to a full-wave rectifier 6 at whose output 7 the signal $|e|$ is emitted.

This rectified signal is fed on line 7 to a smoothing or low-pass filter 8 by means of which the signals concerned are smoothed and the envelope 1 or 3 of the respective signals are generated. Thus, a signal $|e|$, as shown in line B of FIG. 1 for the two different cases, is obtained at the output line 9 of the smoothing filter 8. This signal on line 9 is fed to a differentiator or highpass filter 10 at whose output 11 the differentiated, smoothed signal $i \sim d/dt|e|$ is emitted. The shape of this signal is shown in line C of FIG. 1.

This differentiated signal on line 11 is then fed to an integrator 12 whose integration times are controlled by a control signal ctr on line 13, as shown in line D of FIG. 1. The integration time is controlled with the aid of the signal ctr in such a manner that the peaks 14, 15, 16 and 17 occurring along the signal curve in line C are suppressed. The result of the integration process of the integrator 12 is emitted at the output line 18 and is shaped by an absolute value generator 19 to form an oppositely directed complementary signal $|e_{add}|$ which is emitted at the output line 20 of the absolute value generator 19 and whose curve is shown in line E of FIG. 1.

This line E shows the two different shapes of complementary signals 2' and 4' which are added in accordance with the invention to the actual signal in order to obtain the corrected signal $|e_c|$ whose curve is shown in line F of FIG. 1. This signal in line F is obtained by applying the signal on line 20 to a summing amplifier 21. The output signal of line 7 of the rectifier 6, which is led through a delay element 23 with delay time $\Delta T$, is fed on a second input line 22 to this summing amplifier 21. The delay element 23 is to ensure that the summing of the two signals on lines 20 and 22 starts at the time required, for example, in the case of the left half in FIG. 1. The output signal of the summing amplifier 21 on line 24 is fed to the evaluator circuit 25 on whose output line 26 the position error signal PES is emitted by means of which, for example, a magnetic head, not shown, is kept centered over the desired track.

In the case of a signal drop 2 of this kind, it is possible in accordance with the invention, as shown in the left half of FIG. 1, for the signal applied to the evaluator circuit 25 to be fully compensated for by means of the complementary signal 2' shown in line E. As shown in line F of FIG. 1, such compensation ensures that the signal subsequently corresponds to the original, undisturbed envelope 1 of line A of FIG. 1. In the second case, which is shown in the right half of FIG. 1, the broken line 27 and the arrow 28 between the time axis t and line 27 indicate the average value corresponding to this signal value. Reference number 29 denotes the line which would correspond to the actual average value in the case of the undisturbed envelope 3 without the drop 4. This value is approximately reached with line 30 and distance arrow 31, as illustrated in line F of FIG. 1. In this example neither the original signal nor its shape can be fully restored, but the disadvantages are considerably reduced in that it is possible by addition of the relevant supplementary signal 4' in line E of FIG. 1 to restore the integral value of the signal, i.e., its energy content, to a value there would have been without the drop 4. In such a case, adverse efffects on the position error signal (PES) are eliminated.

We claim:

1. A method of compensating for decreases in the amplitude of servo signals read from a magnetic record for the track following control of a magnetic head, said servo signals appearing in periodic bursts, comprising the steps of
   detecting the amount of said signal amplitude decrease in each said burst,
   generating a complementary oppositely directed correction signal, and
   adding said complementary correction signal to said servo signal prior to use of said servo signal for track following control.

2. A method in accordance with claim 1, including the steps of rectifying said read servo signal, filtering the rectified signal, differentiating and then integrating said filtered signal, deriving the absolute value from said integrated signal to generate said complementary correction signal, and adding said complementary correction signal to the read and rectified signal.

3. A method in accordance with claim 2, wherein said integration of the smoothed and differentiated signal is effected within the boundaries of the time range of interest of the read signal.

4. A method in accordance with claim 2, wherein said integration is effected with a sign which is such that the subsequent addition to the read signal acts in a compensating manner.

5. A method in accordance with claim 2 including the step of delaying said read and rectified signal during said differentiation, integration and generation of said complementary correction signal.

* * * * *

UNITED STATES PATENT AND TRADEMARK OFFICE
CERTIFICATE OF CORRECTION

PATENT NO. : 4,438,467
DATED : March 20, 1984
INVENTOR(S) : Karl H. Schaller, Volker Zimmermann It is certified that error appears in the above-identified patent and that said Letters Patent is hereby corrected as shown below:

Column 3, line 26, "|e|" should be --$|\bar{e}|$--.
Column 3, line 31, "|e|" should be --$|\bar{e}|$--.

Signed and Sealed this

First Day of January 1985

[SEAL]

Attest:

GERALD J. MOSSINGHOFF

Attesting Officer

Commissioner of Patents and Trademarks